United States Patent [19]

Sabel

[11] Patent Number: 4,738,153
[45] Date of Patent: Apr. 19, 1988

[54] MANUAL TRANSMISSION GEARSHIFT MECHANISM WITH REVERSE INHIBITOR

[75] Inventor: Gustav Sabel, Cologne, Fed. Rep. of Germany

[73] Assignee: Ford Motor Company, Dearborn, Mich.

[21] Appl. No.: 944,898

[22] Filed: Dec. 22, 1986

[30] Foreign Application Priority Data

Jan. 23, 1986 [DE] Fed. Rep. of Germany ....... 3601954

[51] Int. Cl.⁴ .................................................. F16H 57/06
[52] U.S. Cl. .......................................................... 74/476
[58] Field of Search ............................................. 74/476

[56] References Cited

U.S. PATENT DOCUMENTS

| 4,275,614 | 6/1981 | Okudo et al. | 74/476 |
| 4,297,910 | 11/1981 | Myers | 74/473 R |
| 4,633,728 | 1/1987 | May | 74/476 |

FOREIGN PATENT DOCUMENTS

| 2062691 | 7/1972 | Fed. Rep. of Germany . |
| 3003079 | 9/1980 | Fed. Rep. of Germany . |
| 1464457 | 2/1977 | United Kingdom . |
| 2097493 | 11/1982 | United Kingdom . |

*Primary Examiner*—Allan D. Herrmann
*Attorney, Agent, or Firm*—Frank G. McKenzie; Donald J. Harrington

[57] ABSTRACT

A gearshift lock for the shift mechanism of a manually operated multiple speed ratio transmission includes a selector shaft rotatable by a gearshift lever under the control of the vehicle operator, a selector finger movable within slots formed in a base plate, the slots being defined by the various positions of the gearshift lever that correspond to speed ratios of the transmission. A spring-loaded rotatable locking cam mounted on the gate plate cooperates with a finger carried on the selector shafts to prevent backward shifting movement from a forward gear position into the reverse gear position and to guide the selector finger into the adjacent gearshift slot. A base plate pivots on a pin fixed to the gate plate against the force of a legged spring to produce a sensible indication to the vehicle operator when greater force is required to move the gearshift lever.

4 Claims, 1 Drawing Sheet

MANUAL TRANSMISSION GEARSHIFT MECHANISM WITH REVERSE INHIBITOR

BACKGROUND OF THE INVENTION

1. Field of the Invention

This invention relates to the field of gearshift mechanisms for use with automotive manual transmissions and more particularly pertains to such mechanisms that require substantial shifting effort by the vehicle operator when selecting reverse gear and to those that prevent engagement of reverse gear in certain circumstances.

2. Prior Art

German patent No. 30 03 079 describes a gearshift mechanism for a multiple speed manual transmission in which the fifth forward gear Position of the selector shaft is located in the same shift plane as the reverse gear position. The gearshift mechanism includes a lock that employs a spring-loaded rotatable locking cam to prevent shifting of the selector shaft from the fifth gear ratio position into the reverse gear position and force the selector shaft into the adjacent shift plane defined by other forward gear positions.

The gearshift mechanism described in that patent includes a spring-loaded locking cam rotatably mounted on a retaining pin inserted between two support plates. In that device it is necessary for the front surface of the locking cam to cooperate with a connection member located between the selector shaft and the gearshift lever. Rear stop surfaces cooperate with the corresponding surfaces on the retaining pin to limit rotational movement. This arrangement requires a large number of parts and the operating accuracy of the locking mechanism is substantially reduced by the accumulation of dimensional tolerances, which arise among the various components.

German application No. 20 62 691 describes a similar gearshift mechanism for a manual transmission in which a gearshift finger guides an internal gearshift plate provided on the selector shaft. The mechanism of this application makes no provision for preventing movement of the gear selector shaft from a forward gear position to the reverse gear position within a shift plane.

SUMMARY OF THE INVENTION

An object of the present invention is to provide a gearshift mechanism for use in a manual transmission that prevents inadvertent engagement of the reverse gear and incorporates as few components as possible, thereby substantially eliminating the accumulation of dimensional tolerances, which would otherwise adversely affect the accuracy of the reverse gearshift lock. By minimizing the number of components the cost of construction and assembly is reduced.

The gearshift mechanism according to this invention includes a selector shaft, which is rotated by movement of a shift lever controlled by the vehicle operator to select gearshift channels or planes and move axially for engaging the selected gear ratio. The selector shaft carries a selector finger, which rotates into selective engagement with several gearshift forks moves the sleeve of synchronizer clutches into engagement with the gear wheel corresponding to the selected gear ratio as the selector shaft moves axially. The selector finger is movable within a system of intersecting slots formed in a gate plate. A spring-loaded, rotatable locking cam prevents movement of the selector finger backward from the forward gear position located at the opposite end of the gate plate slot from the reverse gear position.

This blocking action results because a base plate, pivotably mounted on the gate plate, is held in a neutral position by the action of a leg spring. A cam formed on the base plate moves against the spring force as the selector shaft moves in the reverse gear plane form the forward gear position in that plane to the reverse gear position. The cam rotates as the selector shaft attempts this movement and guides the selector shaft into the adjacent shift plane. In this way, very precise movement of the selector finger back and away from the fifth forward speed ratio position into the adjacent gearshift slot results.

BRIEF DESCRIPTION OF THE DRAWINGS

The invention is explained in greater detail with reference to an embodiment illustrated in accompanying drawings in which.

DESCRIPTION OF THE PREFERRED EMBODIMENT

Figure 1:
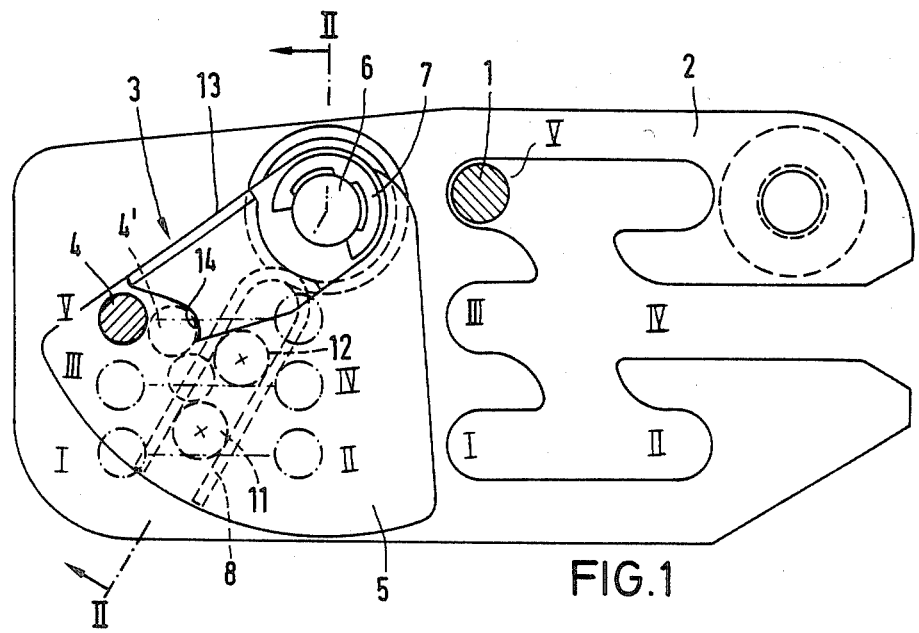
FIG. 1 is a plan view of the gate plate showing the gearshift lock according to this invention and the various positions of a gearshift pin indicted in dash-dot lines.
Figure 2:
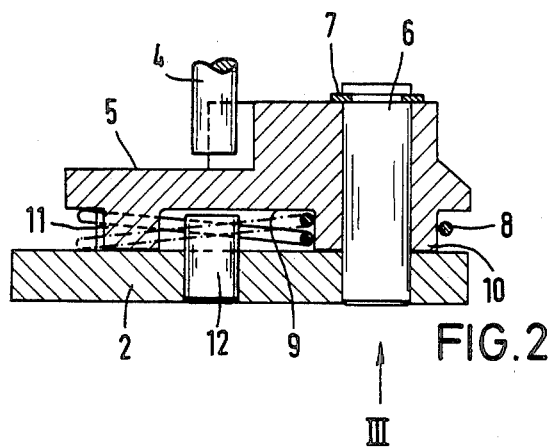
FIG. 2 is a vertical cross section taken at plane II—II in FIG. 1.
Figure 3:
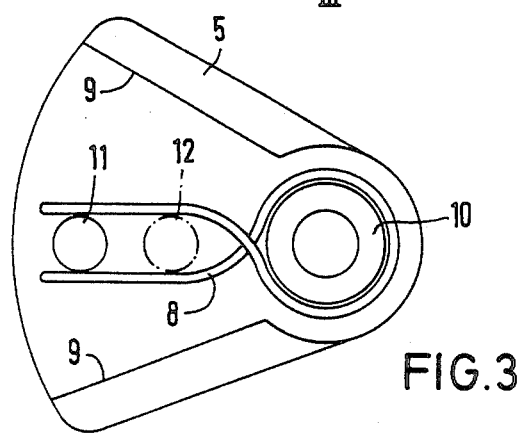
FIG. 3 is a bottom view of the base plate taken in the direction III in FIG. 2.

Referring first to FIG. 1, a selector shaft located in the casing of a manual transmission and controlled by the vehicle operator by movement of the gearshift lever, carries a selector finger 1 which moves within the system of interconnected slots 1-2, 3-4, 5-R formed through the thickness of a gate plate 2 to control the gearshift movements among the five forward gears and the reverse gear. The gate plate is fixed against movement by mechanical connections to the interior 10 surface of the transmission housing. Mounted on the gate plate 2 adjacent the slots in which selector finger 1 moves there is a gearshift lock 3 that includes a base plate 5, a pin 6 and a legged spring 8. The pin 6, fixed by welding to the gate plate, pivotably supports the base plate 5, which has a hole through its thickness, is fitted over the pin and is retained by a ring 7.

The base plate is in the form of a circular sector and includes on its underside a circular boss 10 through which the pin 6 is inserted, a pin 11 extending downward toward the upper surface of the gate plate, and a recess 9 extending radially outward from the axis of pin 6. Another pin 12, fixed to the gate plate, extends upward into recess 9 and is located with pin 11 on a common radius from the axis of pin 6. Spring 8 has its coil surrounding boss 10 and its legs, which extend radially outward from the axis of pin 6, straddling pins 11 and 12.

Base plate 5 is held in the neutral position, i. e., with pins 11, 12 and 6 aligned on a common radius by contact between the legs of spring 8 and pin 11. The base plate can be pivoted against the force of the spring from the neutral position in both angular directions about the neutral position until the legs of spring 8 come into contact with the side walls of recess 9.

The base plate has on its upper surface a catching cam 13 that includes a catching recess 14, which cooperates with an additional gearshift finger 4. Finger 4 can be fixed to the selector shaft and moves through a similar gearshift path as that of finger 1. In FIG. 1, the first four gear positions and the reverse gear position of finger 4 are shown in dot-dash lines; the fifth gear position of finger 4 is cross sectioned. In FIG. 1, the circles drawn in dash lines and labeled 4' represent positions on the guided path of travel of finger 4 from the fifth forward gear position to the three-four gearshift plane.

In operation, when the transmission operates in the fifth forward speed ratio finger, 1 and finger 4 are located in the positions of the cross-sectioned circles labeled 1 and 4. If the selector shaft is moved backward toward the reverse drive position from the fifth gear position, finger 4 strikes catching cam 13 and becomes seated within the catching recess 14. This action prevents straight backward movement of selector finger 1 and finger 4 to the reverse drive positions because cam 13 begins to turn about the axis of pin 6 and causes selector finger 1 and finger 4 to turn in the same direction out of the plane that contains the fifth gear position and the reverse gear position. As cam 13 pivots, selector finger 1 is forced into the adjacent slot defined by the third and fourth gear ratio positions and finger 4 moves to the positions indicated by broken lines at 4'. The entire locking apparatus 3 pivots in the same direction as finger 4 against the force developed on the leg of spring 8 as pin 11 rotates into contact with the spring leg. In this way, the gearshift mechanism is prevented from moving from the fifth gear position to the reverse gear position.

If an attempt is made to shift from the fifth gear position to the reverse gear position, the shift mechanism is guided by the locking mechanism toward the three-four gearshift plane and the force produced by the spring causes a need for the vehicle operator to apply increased effort to move the gearshift lever.

However, if finger 4 is located in the plot defined by the first and second gear positions or in the slot defined by the third and fourth gear positions, direct engagement of the reverse gear is possible. The shift mechanism is moved to the reverse gear position by moving the selector finger 1 through the neutral plane, perpendicular to the one-two and three-four gearshift slots, into the slot defined by the fifth gear position and the reverse gear position. Then the gearshift lever is moved to the reverse gear position, which causes selector finger 1 to move to the reverse drive position within the five-R slot. As finger 1 is moved in the neutral plane from the one-two slot or the three four slot to the five-R slot, base plate 5 is located in the neutral position shown in FIG. 1 and finger 4 is brought into contact with the edge of cam 13 causing base plate 5 and cam 13 to rotate clockwise about the axis of pin 6 against the force of spring 8. The vehicle operator senses the increase shifting effort required to move the gearshift lever in the neutral plane to the five - R slot.

If the selector finger is moved in the neutral, plane from its intersection with the one-two slot or the three-four slot to the neutral position within the five-R slot, finger 1 can be moved directly to the fifth gear position against the force of spring 8 because finger 4 will contact the edge of cam 13 and cause base plate 5 and cam 13 to rotate clockwise about pin 6. However, when finger 1 and 4 are moved to the fifth gear position, the shift mechanism cannot be moved backward to the reverse gear position because finger 4 seats within recess 14 and is guided by counterclockwise rotation of the base plate 5 and cam 13 into the three-four plane if movement of the shift mechanism is attempted from the fifth gear position to the reverse gear position.

Having described the preferred embodiment of my invention, what I claim and desire to secure by U.S. Letters Patent is:

1. A gear shift mechanism for preventing gear shift movement between speed ratio positions of a multiple speed ratio transmission, comprising:
    a first finger moveable among various speed ratio positions;
    a pivotably mounted base plate having cam means engageable by the first finger when it moves to a first speed ratio position for preventing movement of the first finger from the first speed ratio position to a second speed ratio position located in a first speed ratio line defined by first and second speed ratio positions, and for guiding the first finger to rotate about the pivot mounting of the base plate away from said line as the first finger is moved from the first speed ratio position; and
    means for resiliently biasing the base plate toward a neutral position and for opposing movement of the base plate away from said neutral position.

2. The mechanism of claim 1 wherein the neutral position of the base plate is located on a line directed radially from said pivot mounting of the base plate, and the biasing means includes a spring looped around said pivot mounting, having legs extending radially outward from said pivot mounting and straddling said first finger.

3. The mechanism of claim 1 further comprising:
    a gate plate having a system of interconnected slots defining speed ratio lines, each speed ratio line being defined by pairs of speed ratio positions; and
    a selector finger extending within the system of interconnected slots for movement among the speed ratio positions, movement of the selector finger corresponding to movement of the first finger;
    wherein the gate plate slot that connects the first speed ratio line and an adjacent speed ratio line defines an arcuate surface that permits unobstructed pivotal movement of the first finger about said pivot mounting and corresponding movement of the selector finger.

4. The mechanism of claim 3 wherein the base plate includes:
    a pivot pin fixed to the guide plate;
    a spring looped around the pivot pin and having spaced legs extending outward from the pivot pin;
    a first pin fixed to the gate plate, said pivot pin and said first pin defining a neutral plane located on a radius extending from the pivot pin, said first pin located between the legs of the spring; and
    a second pin located on the base plate, straddling the legs of the spring and displacing a leg of the spring as the base plate pivots from the neutral plane.

* * * * *